(12) United States Patent
Bond et al.

(10) Patent No.: US 6,948,451 B2
(45) Date of Patent: Sep. 27, 2005

(54) APPARATUS AND METHOD FOR SHAMPOOING DOGS, HORSES AND OTHER ANIMALS

(75) Inventors: Aritee Poletis Bond, Reisterstown, MD (US); Ralph W. Brindle, Pylesville, MD (US); Andy C. Retzlaff, Glen Rock, PA (US)

(73) Assignee: Bond, Aritee Poletis, Reisterstown, MD (US)

( * ) Notice: Subject to any disclaimer, the term of this patent is extended or adjusted under 35 U.S.C. 154(b) by 0 days.

(21) Appl. No.: 10/385,402

(22) Filed: Mar. 7, 2003

(65) Prior Publication Data

US 2004/0173163 A1 Sep. 9, 2004

(51) Int. Cl.⁷ ................................................ A01K 13/00
(52) U.S. Cl. ...................... 119/665; 119/604; 119/652; 101/289; 101/42
(58) Field of Search ............................. 401/289, 6, 27, 401/28, 38, 40–43, 118, 137, 138, 144, 203–205; 119/600, 611, 612, 633, 603, 604, 665, 650, 652; 132/148, 272; 15/320, 322

(56) References Cited

U.S. PATENT DOCUMENTS

| | | | | |
|---|---|---|---|---|
| 2,250,878 A | * | 7/1941 | Quaranti | 401/28 |
| 2,266,902 A | | 12/1941 | Perkins | 299/84 |
| 2,538,850 A | | 1/1951 | Simms | 299/88 |
| 2,546,618 A | | 8/1951 | Williams | 299/84 |
| 2,795,460 A | | 6/1957 | Blecher et al. | 299/84 |
| 3,361,300 A | | 1/1968 | Kaplan | 222/133 |
| 3,989,391 A | | 11/1976 | Thorner | 401/43 |
| 4,461,052 A | * | 7/1984 | Mostul | 15/29 |
| 4,651,930 A | | 3/1987 | Magaha, Jr. | 239/318 |
| 4,901,923 A | | 2/1990 | McRoskey et al. | 239/326 |
| 5,067,444 A | * | 11/1991 | Parker | 119/606 |
| 5,213,432 A | * | 5/1993 | Chappell | 401/273 |
| 5,279,256 A | | 1/1994 | Brite | 119/85 |
| 5,454,656 A | * | 10/1995 | Rowe | 401/146 |
| 5,649,334 A | * | 7/1997 | Henriquez et al. | 15/29 |
| 5,649,502 A | * | 7/1997 | Frank | 119/665 |
| 5,669,558 A | * | 9/1997 | Ichel | 239/311 |
| 5,740,968 A | * | 4/1998 | Mueller | 239/526 |
| 5,875,926 A | * | 3/1999 | Schwartz | 222/79 |
| 5,881,955 A | | 3/1999 | Styne | 239/310 |
| 6,000,626 A | * | 12/1999 | Futo et al. | 239/74 |
| 6,003,786 A | | 12/1999 | Schwary | 239/310 |
| 6,047,703 A | * | 4/2000 | Paglericcio et al. | 132/113 |
| 6,446,578 B1 | | 9/2002 | Irwin | 119/604 |
| 6,453,848 B1 | | 9/2002 | Hachey | 119/602 |
| 2002/0166511 A1 | | 11/2002 | Porter | 119/604 |
| 2003/0230645 A1 | * | 12/2003 | Groblebe et al. | 239/526 |

FOREIGN PATENT DOCUMENTS

EP 0294030 A2 * 4/1988 ........... A46B/11/06

* cited by examiner

Primary Examiner—Harvey E. Behaens
Assistant Examiner—Kimberly S. Smith
(74) Attorney, Agent, or Firm—Armstrong, Kratz, Quintos, Hanson & Brooks, LLP (57) ABSTRACT

A shampooing tool has a "clam-shell" design for trapping the components of the tool between the complementary mating halves of the housing. The components include a barrel disposed in the upper portion of the housing and connected to a pressurized water source, a trigger depending from an enclosed hand grip, a normally-closed spring-loaded valve disposed in the front portion of the housing and connected to the trigger for movement in unison, and a cylinder within the lower part of the housing, the cylinder having a pressurized liquid detergent and further having a discharge port leading to a valve seat. When the trigger is depressed, the valve is unseated; and the liquid detergent, under pressure, flows into a tube running substantially parallel to the barrel. A shampooing head on the end of the barrel has first and second orifices connected to the barrel and to the tube, respectively; and the respective first and second orifices are independent of each other and are arranged intermediately of the bristles on the shampooing head. The shampooing tool is intended, primarily, for dogs, horses or other animals.

25 Claims, 12 Drawing Sheets

APPARATUS AND METHOD FOR SHAMPOOING DOGS, HORSES AND OTHER ANIMALS

FIELD OF THE INVENTION

The present invention relates to a shampooing tool and, in particular, to a shampooing tool for dogs, horses and other animals.

BACKGROUND OF THE INVENTION

In the prior art, of which we are aware, various hand-held shampooing tools have been disclosed for use on building structures, cars and pets. However, these prior art disclosures leave much to be desired, especially for use with dogs, horses and/or other animals; and, indeed, I am not aware of any practical commercial product currently on the market which is intended, primarily, for shampooing dogs, horses and/or other animals.

For example, in scrubbing a dog by hand with (or without) the use of a sponge, and in maintaining control of the dog, it is necessary to continually or repeatedly bend one's body or stoop over the dog; and as a result, scrubbing and rinsing the dog becomes a real chore which is very tiresome and, frequently, results in aggravating back pains or other joint or muscular strains. Additionally, the prior art devices often aspirate the liquid soap out its reservoir by means of the water flow under pressure, and this process tends to quickly use up the reservoir of soap; hence is wasteful and undesirable.

Market research has shown that there are roughly 50,000,000 dogs and 4,000,000 horses in the United States alone, besides the potential for world-wide sales; yet despite this critical need, no practical ergonomically-designed shampooing tool currently exists on the market for grooming dogs, nor has the versatility to groom dogs, horses and/or other animals.

Moreover, the prior art devices tend to be cumbersome and complicated; and even if relatively simple (such as a hand-held tool for washing cars) the prior art devices are not well suited for the particular environment or application to a dog, horse and/or other animal.

SUMMARY OF THE INVENTION

Accordingly, it is an object of the present invention to alleviate the disadvantages and deficiencies of the prior art by providing a compact, lightweight well-balanced sturdy shampooing tool, one which is ergonomically designed and hence convenient and easy to use and control, and one which is well suited for use on a dog, horse or other animal.

It is another object to the present inventor to provide a tool which will enable the owner, while seated, to shampoo his or her dog, thereby avoiding potentially-disabling back or other health problems; yet will allow the same shampooing tool to be used in a normal standing position while grooming a horse.

It is yet another object of the present invention to provide a shampooing tool which has an elegant design, one which may be manufactured in high volume and at relatively low cost, and thus may be merchandised and promoted through various channels of marketing and distribution.

It is a further object of the present invention to provide a shampooing tool wherein the water flow and the discharge of the liquid detergent are completely independent of each other, such that use of the liquid detergent is metered, thereby improving the operator's control of the tool while conserving the use of the liquid detergent or other soap.

In accordance with the teachings of the present invention, a shampooing tool is herein disclosed which includes a housing having an upper portion forming a hand grip for the tool, the hand grip being provided with a trigger. The housing includes a lower portion having a cylinder provided with a reservoir of liquid detergent under pressure, and the housing further includes a front portion connecting the respective upper and lower portions of the housing. A spring-loaded normally-closed valve is disposed within the front portion of the housing, and the valve closes a valve seat connected to the pressurized reservoir of liquid detergent. The valve is connected to the trigger for movement in unison; such that when the trigger is actuated, the valve is unseated and liquid detergent passes through the valve seat, around the valve, and through a discharge port in the front portion of the housing. A tube is connected to the discharge port and projects forwardly alongside a barrel. The barrel is disposed in the upper portion of the housing, and the barrel has a rearward portion adapted to be connected to a pressurized water source. A shampooing implement is carried on the forward ends of the barrel and tube, respectively.

In a particular embodiment of the present invention, the housing has a pair of complementary mating halves joined together along a common longitudinal midplane. The trigger, valve and cylinder are mounted in one of the mating halves of the housing; and the other mating half of the housing comprises a cover secured to the one mating half, thereby trapping the trigger, valve and cylinder within the housing.

Preferably, the trigger includes an integrally-molded rib portion slidably mounted between respective pairs of lands formed in the one mating half of the housing. The valve has an integrally-molded stem projecting upwardly in the housing; and the stem, in turn, has a slot formed therein for receiving a forwardly-extending integrally-molded portion of the trigger.

In the preferred embodiment, a piston is mounted for slidable movement within the cylinder; rearwardly of the reservoir, and the piston is connected by a lanyard to an end cap. The end cap is threaded on to a portion of the cylinder projecting rearwardly of the housing. A coil spring surrounds the lanyard (radially thereof) and the coil spring is disposed within the cylinder for "free-floating" axial movement therein. One end of the coil spring is seated within the piston, and the other end of the coil spring is seated within the end cap. When the reservoir is filled, and when the end cap is secured, on the cylinder, the coil spring is axially compressed within the cylinder, thereby pressuring the reservoir of liquid detergent within the cylinder. The cylinder also has a forward opening in communication with the reservoir of liquid detergent, and an internal tube is disposed within the housing and connects the valve seat to the forward opening on the cylinder.

Preferably, the housing has a rearward portion connecting the respective upper and lower portions of the housing, such that the hand grip is fully enclosed. Moreover, the upper portion of the housing is provided with curved finger indentations projecting into the fully-enclosed hand grip, and these curved finger indentations are disposed rearwardly of the trigger.

Viewed in another aspect, the shampooing tool of the present invention includes a housing forming a hand grip for the tool, and a trigger is disposed within the hand grip. The trigger has an integrally-molded rib portion slidably mounted within the housing, and the trigger further has a forwardly-extending integrally-molded portion disposed substantially perpendicularly of the rib portion of the trigger. A valve is disposed within the housing, and the valve has an upwardly-extending stem portion provided with a slot for receiving the forwardly-extending portion of the trigger, such that the trigger and valve move in unison.

In another aspect of the present invention, with the piston connected to the end cap by the lanyard, with the coil spring seated between the piston and the end cap, and with the spring thus "trapped" by the lanyard, the piston, end cap, lanyard and spring form a subassembly, This subassembly may be removed from the rearwardly-extending portion of the cylinder, and liquid detergent may then be poured into the cylinder to provide the reservoir. The subassembly is then re-inserted into the cylinder, and the end cap is tightened on the rearwardly-extending portion of the cylinder, thereby providing a pressurized reservoir of liquid detergent within the cylinder.

The present invention also constitutes the method of shampooing a dog, horse or other animal, wherein the liquid detergent (the soap) and the water flow are independently controlled by the operator of the tool. This method comprises the steps of providing a shampooing tool having a trigger within an enclosed hand grip on the tool, the tool further having a valve closing off a valve seat connected to a pressurized source of liquid detergent disposed within a lower portion of the housing. The tool further has a barrel disposed in an upper portion of the housing, and the barrel has a forward portion connected to a shampooing implement and further has a rearward portion connected to a pressurized water supply through a control means. The control means is released to allow water to soak the dog, horse or other animal. The trigger is actuated to unseat the valve from its valve seat, such that the liquid detergent under pressure mixes with the water flow. Alternately, the dog, horse or other animal may be "soaked" first with the water flow while the soap is turned "off" (the trigger not being actuated) and thereafter, the water flow turned "off" by the control means, and the trigger actuated to "soap up" the animal, using the water already on the animal. The shampooing head is then manually manipulated to scrub down the dog, horse or other animal. Then, with the trigger not being actuated, and with the control means on the barrel in an open position, the dog, horse or other animal is rinsed off, thereby conveniently providing a "soap", "scrub" and "rinse" cycle, respectively.

Since the water flow and dispensing of the liquid detergent (the soap) are manually controllable, independently of each other, the soap may be metered under full operator control for economical usage of the shampooing tool. Moreover, the intensity of the water flow may be easily adjusted by the operator.

In another embodiment of the present invention, the cylinder has a portion accessible externally of the housing; and a pre-packaged disposable cartridge, filled with a liquid detergent under pressure, is inserted through the externally-accessible portion of the cylinder and engages a needle within the cylinder, thereby rupturing a frangible seal on the cartridge. The cylinder has a discharge port in fluid communication with the needle for flow of the pressurized liquid detergent out of the ruptured cartridge in the cylinder. Preferably, the cartridge has an internal propellant for pressurizing the liquid detergent.

In this embodiment, a closure means is provided for the externally-accessible portion of the cylinder, and the closure means resiliently biases the cartridge forwardly of the cylinder and into engagement with the needle on the cylinder. Preferably, the closure means includes an internally-threaded end cap, and the externally-accessible portion of the cylinder is externally threaded to receive the internally-threaded end cap. The end cap carries a spring engaging a rearward portion of the cartridge, thereby resiliently biasing the cartridge forwardly to engage the needle in the cylinder.

In each embodiment, the respective end cap may be removed and replaced by a suitable coupling through a hose to a pressurized tank of liquid detergent.

Viewed in yet another aspect, the present invention provides a shampooing tool which includes a barrel connected to a pressurized water supply. A tube is connected to a pressurized source of liquid detergent, the tube running substantially parallel to the barrel. The barrel and tube have respective forward ends connected to a shampooing head. This shampooing head has a first orifice (or first set of orifices) in fluid communication with the barrel and the pressurized water supply; and the shampooing head further has a second orifice (or second set of orifices) in fluid communication with the pressurized source of liquid detergent, the respective first and second orifices being independent of each other. Preferably, the shampooing head has downwardly-projecting bristles intermediately of the respective first and second orifices.

Preferably, a first control means is provided for the water flow, and a second control means is provided for the flow of liquid detergent through the shampooing head. The second control means comprises a trigger which is actuated to selectively unseat a normally-closed spring-loaded valve connecting the tube to the pressurized source of liquid detergent in the housing.

These and other objects of the present invention will become apparent from a reading of the following specification, taken in conjunction with the enclosed drawings.

BRIEF DESCRIPTION OF THE DRAWINGS

In FIG. 7, the subassembly of an end cap, spring and piston has been removed from the cylinder in the lower portion of the housing.

In FIG. 8, the liquid detergent is being poured through a funnel into the cylinder in the housing, thereby providing a reservoir of liquid detergent in the housing.

In FIG. 9, the subassembly of the end cap, spring, lanyard and piston has been inserted, partially, into the cylinder.

In FIG. 10, the end cap has been tightened on the cylinder to thereby compress the spring (and through the spring to resiliently bias the piston) to pressurize the reservoir of liquid detergent in the housing.

GENERAL DESCRIPTION OF THE PREFERRED EMBODIMENTS

Figure 1A:
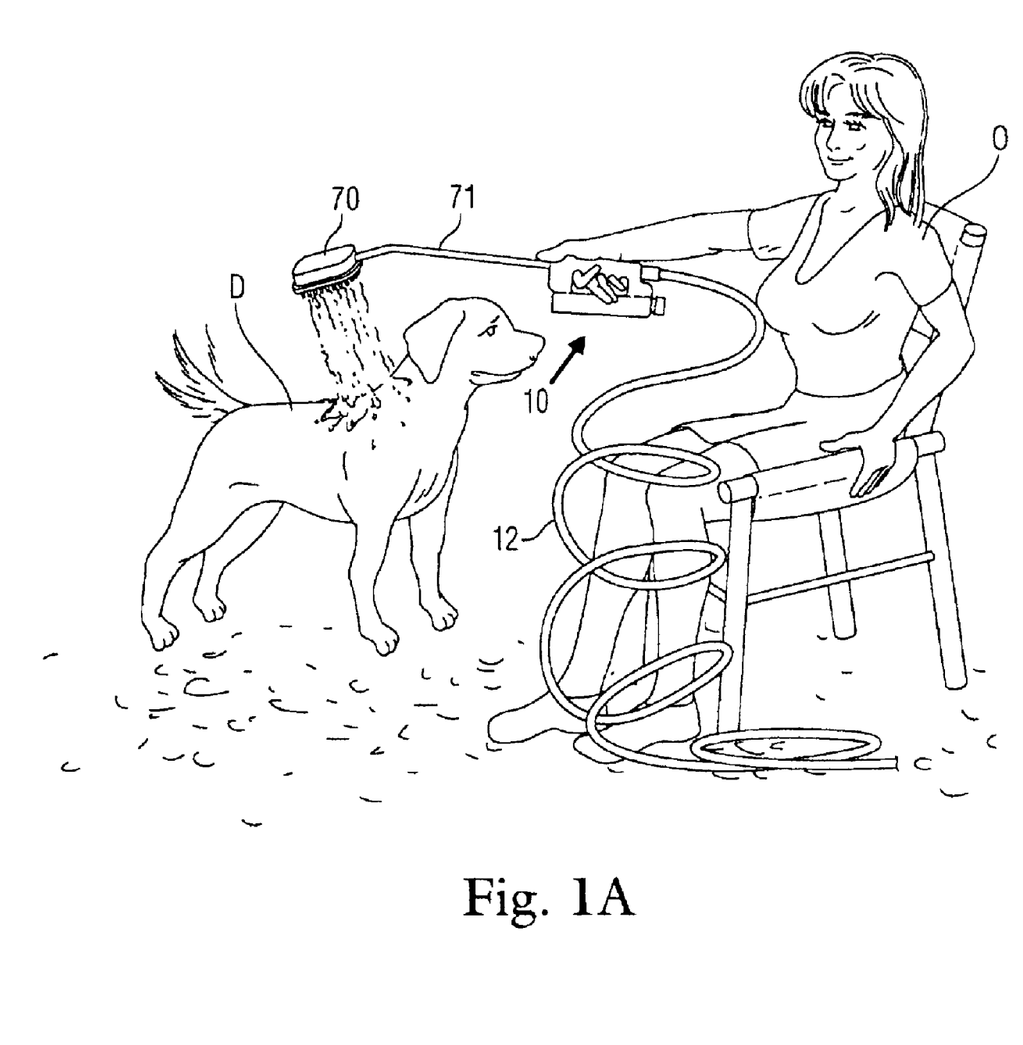
FIG. 1A is a pictorial view of one embodiment of the shampooing tool being used on a dog. In this case, a golden retriever is being rinsed off, while the dog's owner (or other operator) is comfortably seated in a chair.

With reference to FIG. 1A, there is illustrated the shampooing tool 10 of the present invention being used on a dog D by its owner O (or by the operator O of the tool 10). As shown, the dog D is getting pre-soaked (or rinsed off) by use of the tool 10 while the owner (or operator O) is comfortably seated in a chair. In this example, the dog D is a golden retriever; however, it will be appreciated by those skilled in the art that the shampooing tool 10 of the present invention may be used on other dogs and/or other animals, as for example, horses.

Figure 1B:
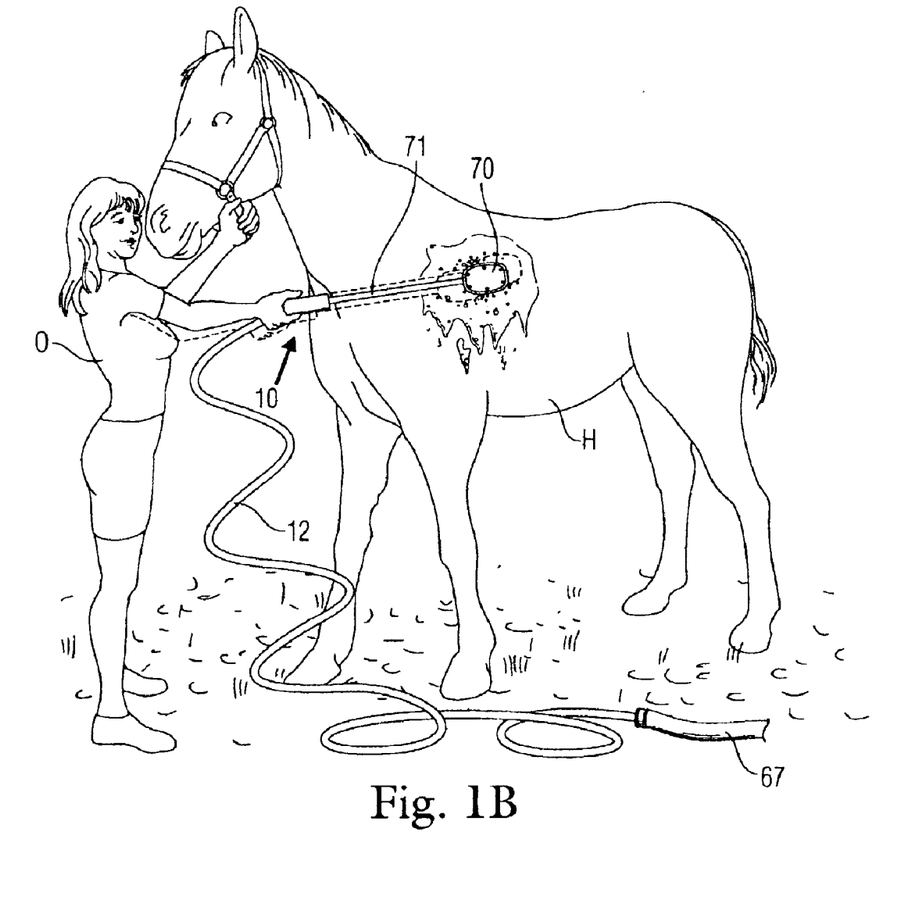
FIG. 1B is a further pictorial view, showing the shampooing tool of the present invention being used to soak down (or soap up) a horse, in which case the operator is standing in a normal, comfortable position.

Indeed, with reference to FIG. 1B, the tool 10 is being used to scrub down a horse H while the owner (operator) O is standing normally, not crouching nor bending. This illustrates the ergonomic improvement as well as the widespread versatility of the shampooing tool 10 of the present invention.

Besides, its widespread application and versatility, it will be appreciated by those skilled in the art that the shampooing tool 10 of the present invention is easy, quick and convenient to use. In this regard, the tool is coupled to a coiled, lightweight hose 12 connected, in turn, to a pressurized water supply.

Figure 2:
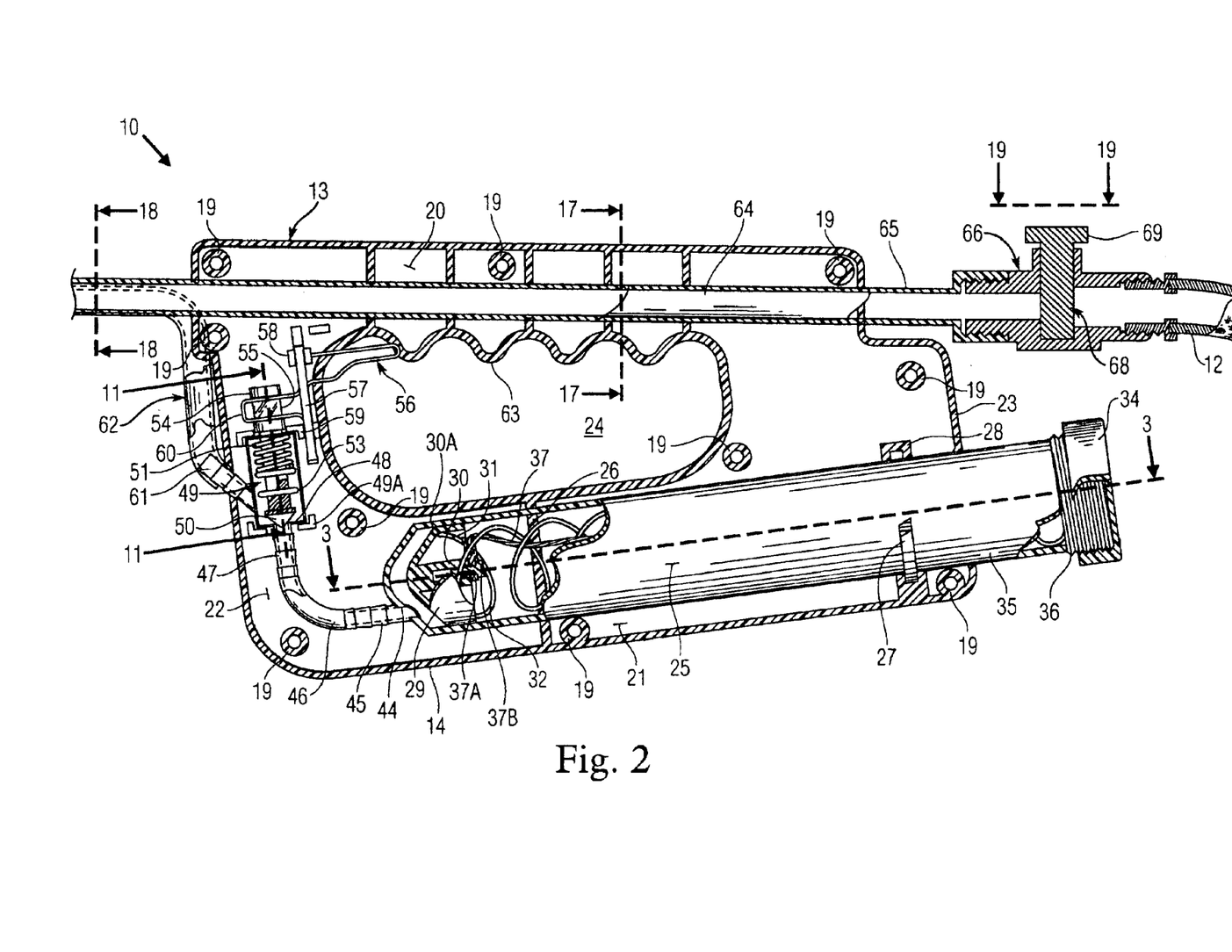
FIG. 2 is a longitudinal cross-section of the shampooing tool of FIG. 1, and in particular the housing portion thereof, taken along the lines 2—2 of FIG. 1 and enlarged in scale.
Figure 3:
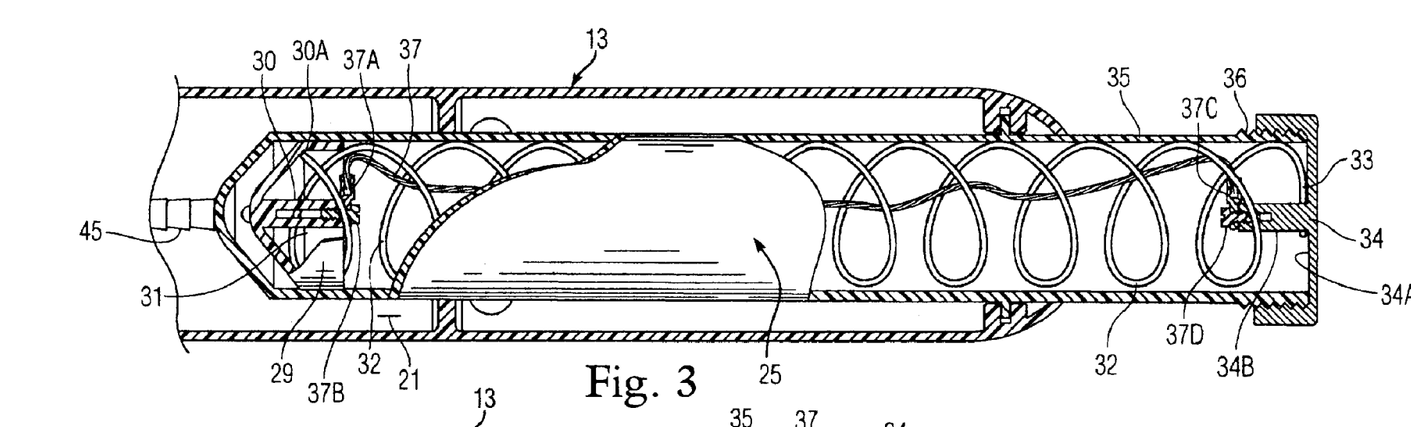
FIG. 3 is a detailed cross-section, taken along the lines 3—3 of FIG. 2, showing a cylinder in the lower portion of the housing, and further showing a piston slidably received in the cylinder. In this view, the liquid detergent has been fully used up, and the piston is all the way down in the cylinder.
Figure 4:
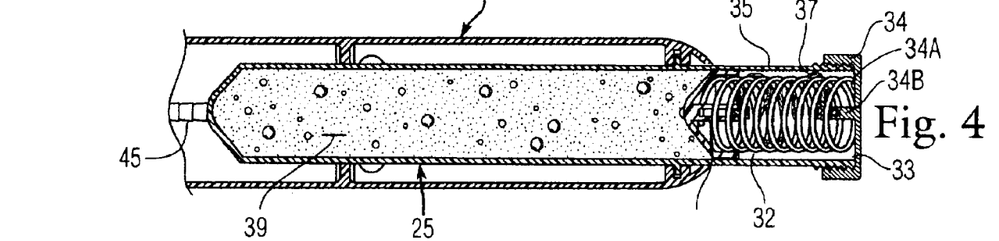
FIG. 4 is a further cross-sectional view, corresponding substantially to FIG. 3, but showing a reservoir of liquid detergent forwardly of the piston in the cylinder, and further showing the piston substantially fully retracted rearwardly in the cylinder. In this view, the spring is compressed to exert a resilient bias on the piston, thereby pressing on the piston to pressurize the liquid detergent in the cylinder.
Figure 11:
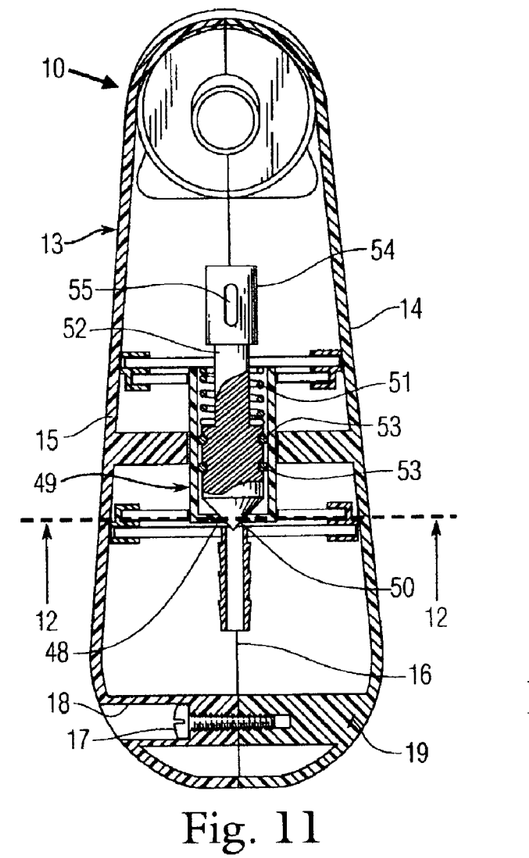
FIG. 11 is a cross-section, taken along the lines 11—11 of FIG. 2, and showing the valve assembly in a front portion of the housing for the shampooing tool.

With reference to FIGS. 2–4, and with further reference to FIG. 11, the shampooing tool 10 preferably has a so-called "clam shell" design. Accordingly, its housing 13 includes a pair of complementary mating halves 14 and 15, respectively, joined together along a common longitudinal midplane 16 (as shown more clearly in FIG. 11). The components of the tool 10 are mounted in the "bottom" half 14 of the housing 13, and the "top" half 15 of the housing 13 constitutes a cover. When the mating halves 14 and 15 are secured together, the components of the tool 10 are trapped within the overall housing 13. As shown in FIG. 11, screws 17 pass through openings 18 in the top (cover) half 15 and are received in respective bosses 19 in the bottom half 14 of the housing 13. It will be appreciated, however, that other fastening means and indeed other housing designs may be used consonant with the teachings of the present invention.

Figure 5:
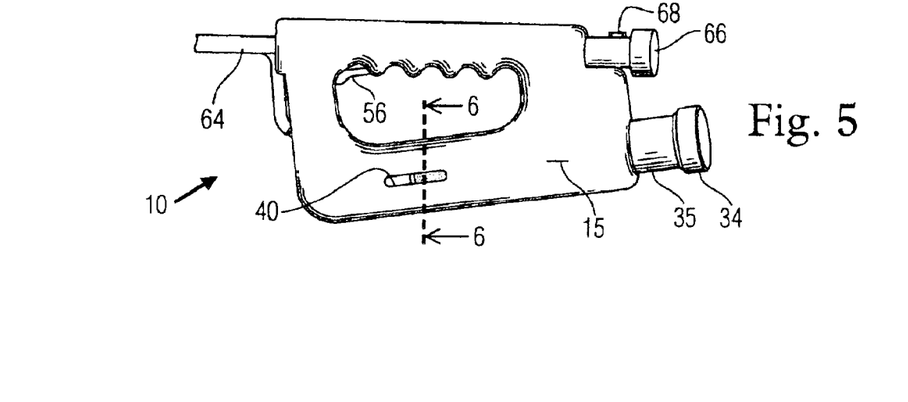
FIG. 5 is an elevational view of the lower portion of the housing, showing a slot having a window in the housing for viewing the level of liquid detergent remaining in the cylinder.

With this in mind, and with reference again to FIG. 2 and further reference to FIGS. 3–5, the housing 13 (when the respective halves 14 and 15 thereof are suitably joined together) includes an upper portion 20, a lower portion 21, a front portion 22 and a rear portion 23 joining the upper portion 20 and lower portion 21 to form, preferably, a completely enclosed hand grip 24.

A cylinder 25 is disposed within the lower portion 21 of the housing 11 and is trapped therein, both fore and aft. Preferably, the lower housing portion 21 has a semi-cylindrical boss 26 for cradling the cylinder 25 fore; and the cylinder 25 carries a ring 27 received in a similar (complementary) boss 28 in the housing 13, thereby cradling and positioning the cylinder 25 aft within the housing 13.

Figure 2A:
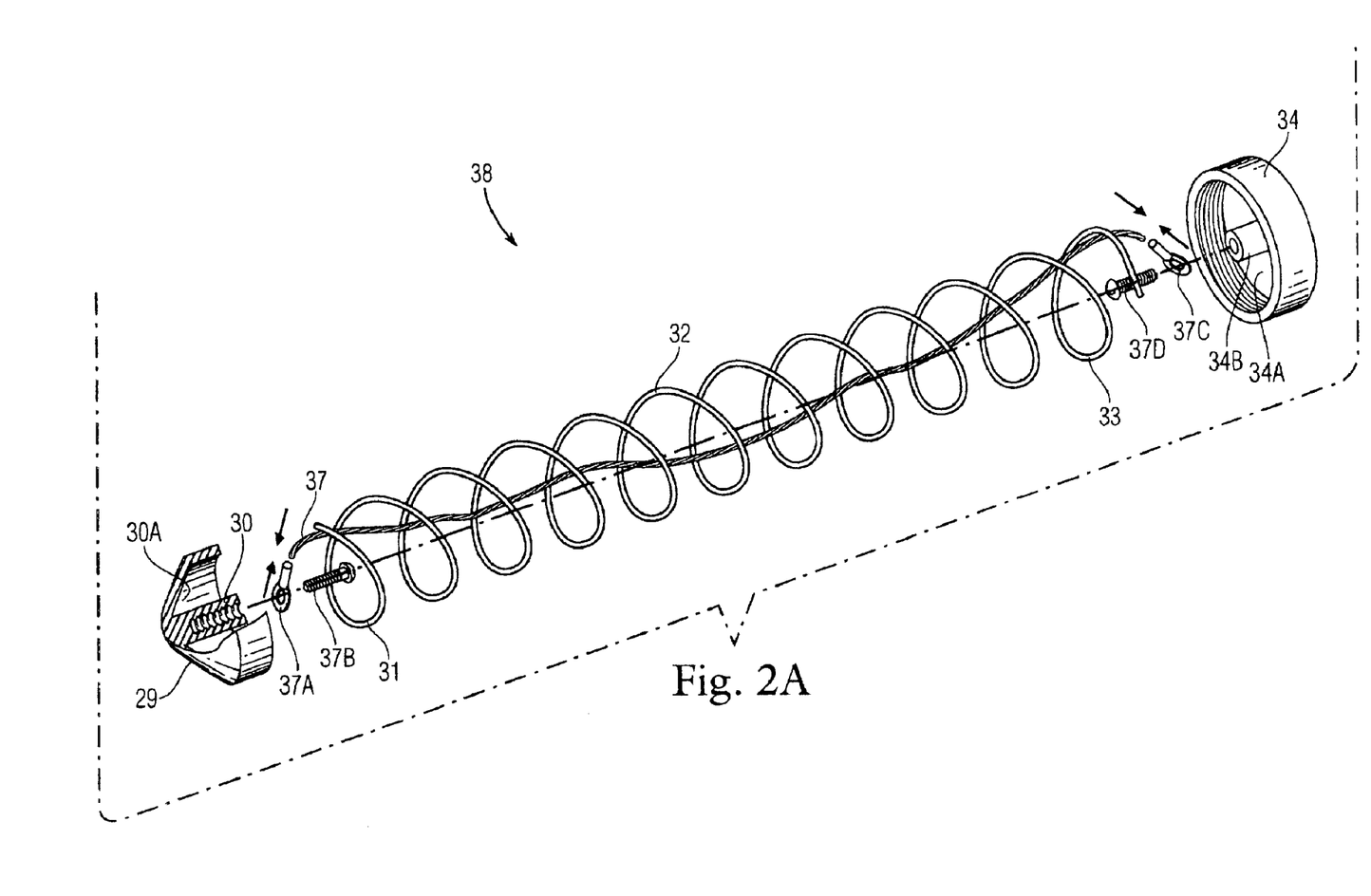
FIG. 2A is an exploded perspective view of the subassembly comprising the piston, end cap, lanyard and coil spring (the subassembly being removably received in the cylinder, and the cylinder being retained within the shampooing tool of the present invention).

With reference again to FIG. 2, and with further reference to FIG. 2A, a piston 29 is slidably received within the cylinder 25. Preferably, the piston 29 has an integrally-molded rearwardly-projecting central sleeve or boss 30, thereby forming an annular groove, well or trepan 30A within the piston 29. One end 31 of an elongated coil spring 32 is seated in the trepan 30A (and radially of the boss 30). The other end 33 of the spring 32 is seated in a trepan 34A (radially of a central boss 34B) in an end cap 34. This end cap 34 is carried by a rearward portion 35 of the cylinder 25 protruding rearwardly of the housing 13. Preferably, the rearwardly-projecting portion 35 of the cylinder 25 is externally threaded (as at 36) to receive internal threads on the end cap 34.

A lanyard 37 is connected between the piston 29 and the end cap 34. Preferably, the lanyard 37 comprises several strands of twisted wire, thereby forming a strong, flexible cable. One end of the lanyard 37 has a crimped-on eyelet 37A secured by a screw 37B to the central boss 30 on the piston 29. Preferably, the eyelet 37A is a conventional terminal used in the electrical arts. The other end of the lanyard 37 carries a similar crimped-on eyelet 37C secured by a screw 37D to the central boss 34B on the end cap 34.

The spring 32 is "free-floating" axially within the cylinder 25 (being confined radially therein) and is, in effect, "trapped" by the lanyard 37.

Figures 7, 8, 9, 10:
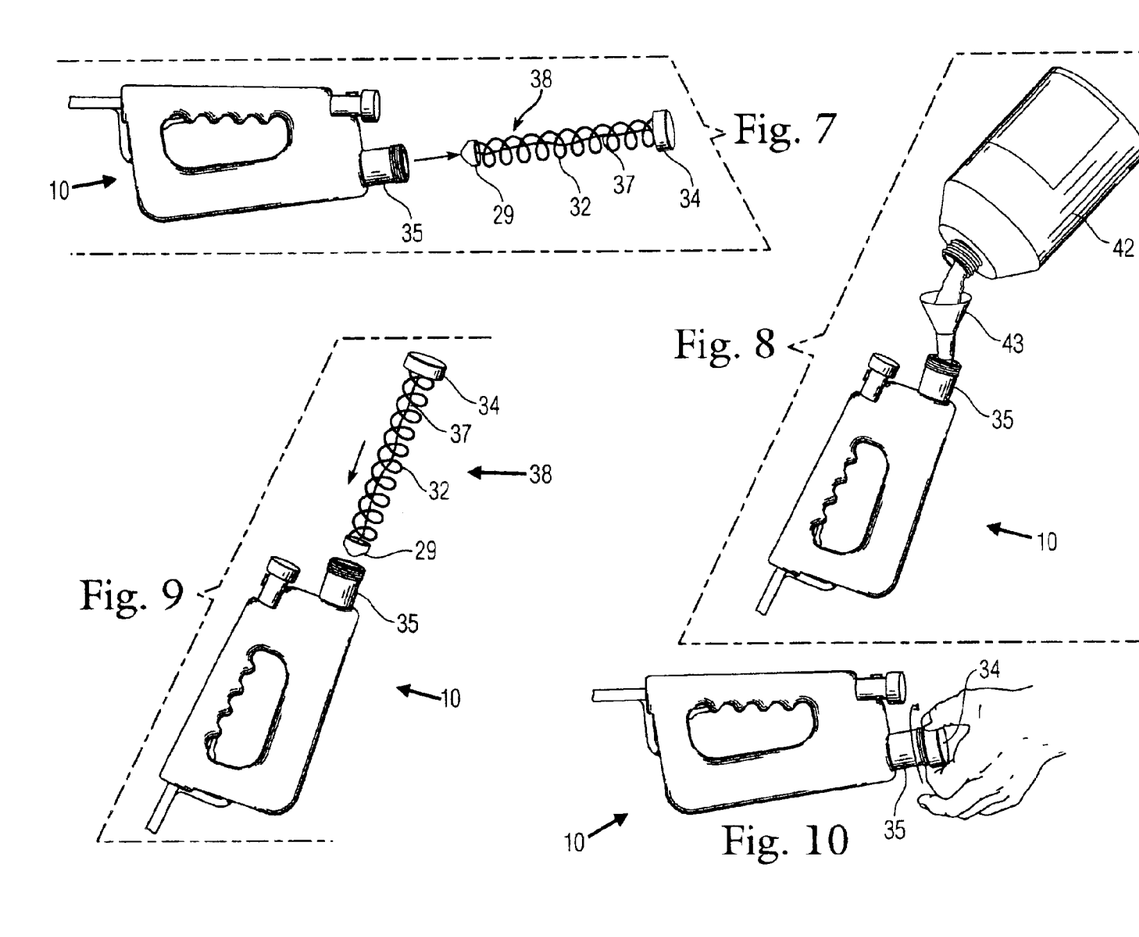
FIGS. 7—10 are pictorial sequence views, showing the manner in which the liquid detergent is poured into the cylinder.

As a result, the piston 29, spring 32, end cap 34 and lanyard 37 form a complete subassembly 38 (see FIG. 7). This subassembly 38 creates a resilient bias on a reservoir of liquid detergent 39 within the cylinder 25, thereby pressurizing the reservoir 39 (as shown in FIG. 4).

Figure 6:
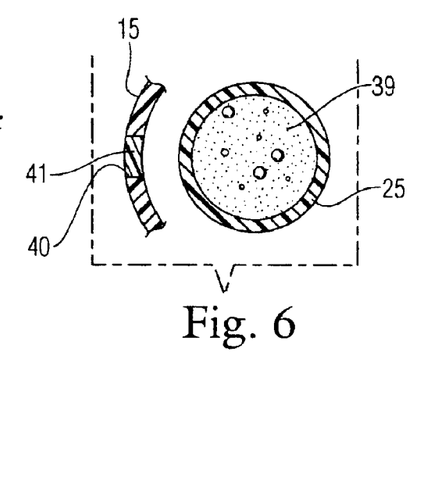
FIG. 6 is a cross-section thereof taken along the lines 6—6 of FIG. 5, enlarged in scale, and showing the window and the cylinder (both of which are transparent).

With reference to FIGS. 5 and 6, a slot 40 is formed in one of the mating halves of the housing 13 (preferably within the top cover half 15) to receive a transparent window 41 for conveniently viewing the level of liquid detergent 39 remaining in the cylinder 25. As shown in FIG. 6, the cylinder 25 (or at least a portion thereof) is also made transparent.

With reference to FIGS. 7–10, replenishing the reservoir 39 of liquid detergent is therein illustrated. In FIG. 7, the subassembly 38 (of the piston 29, spring 32, end cap 34 and lanyard 37) has been removed from the shampooing tool 10. The tool 10 is then positioned (as in FIG. 8) for liquid detergent to be poured from a container 42 through a funnel 43 into the cylinder 25 in the tool 10. Thereafter, the subassembly 38 is re-inserted into the cylinder 25 in the tool 10 (FIG. 9) and the end cap 34 is tightened on to the rearwardly-projecting portion 35 of the cylinder 25 (as shown in FIG. 10) to thereby compress the spring 32 and again pressurize the reservoir 39 of liquid detergent in the tool 10.

Figure 12:
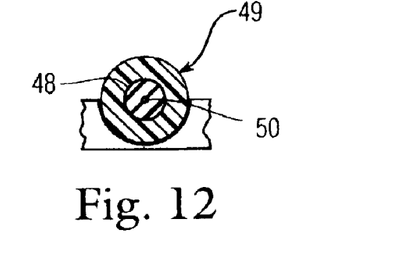
FIG. 12 is a cross-sectional view thereof, taken along the lines 12—12 of FIG. 11, and showing the valve seat.
Figure 13:
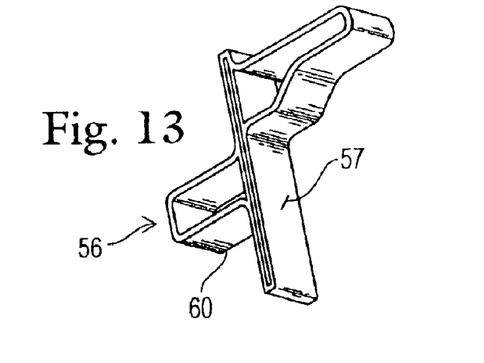
FIG. 13 is a perspective view of the integrally-molded trigger.
Figures 14, 15:
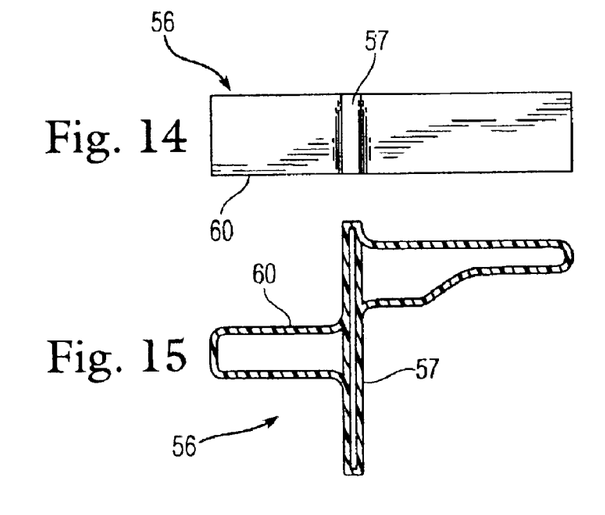
FIG. 14 is a top plan view thereof.
FIG. 15 is an elevational view thereof.
Figure 16:
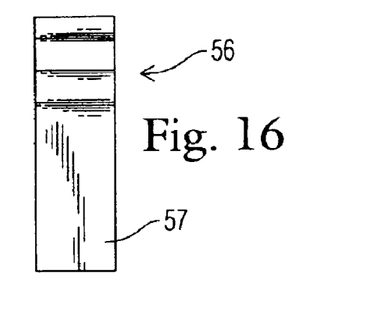
FIG. 16 is an end view thereof.

With reference again to FIG. 2, and with further reference to FIGS. 11 and 12, the forward portion of the cylinder 25 has a discharge port 44 leading to a nipple 45. This nipple 45 carries an internal tube 46 joined to a nipple 47 which, in turn, leads to a valve seat 48. This valve seat 48 cooperates with a valve (or valve assembly) 49 disposed in the front portion 22 of the housing 13.

This valve 49 is positioned between complementary lands 49A and (like the cylinder 25) is trapped between the mating halves 14 and 15 of the housing 13. The valve 49 has a conical tip 50 normally seating on the valve seat 48 and resiliently biased thereon by a coiled spring 51 piloted on a stem portion 52 of the valve 49. Thus, the valve 49 is normally closed. The valve 49 carries two o-rings 53 for sealing purposes, and an upwardly-extending portion 54 of the valve stem 52 has a transverse slot 55 formed therein.

With reference again to FIG. 2, and with further reference to FIGS. 13–16, a trigger 56 is also trapped, preferably, within the complementary mating halves 14 and 15, respectively, of the housing 13. This trigger 56 has an integrally-molded main rib portion 57 piloted for limited sliding movement within two pairs of lands 58 and 59, respectively, within the housing 13 (as shown more clearly in FIG. 2). The trigger 56 further has an integrally-molded forwardly-projecting portion 60 received within the transverse slot 55 in the valve 49.

Accordingly, when the trigger 56 is actuated (as, for example, by being depressed within the enclosed hand grip portion 24 of the tool 10) the trigger 56 and valve 49 move in unison, against the resilient bias of the spring 51, to unseat the valve 49 from its valve seat 48. As a result, the pressurized liquid detergent 39 flows past the valve seat 48 around the valve 49 and into a nipple 61 extending out of the housing 13 (FIG. 2) and into a tube 62 disposed externally of the housing 13.

Preferably, and as shown in FIG. 2, the enclosed hand grip 24 of the housing 13 has a plurality of integrally-molded finger indentations 63 rearwardly of the trigger 56; such that the shampooing tool 10 of the present invention, besides being relatively lightweight and well balanced, is comfortable and convenient to use.

Figure 19:
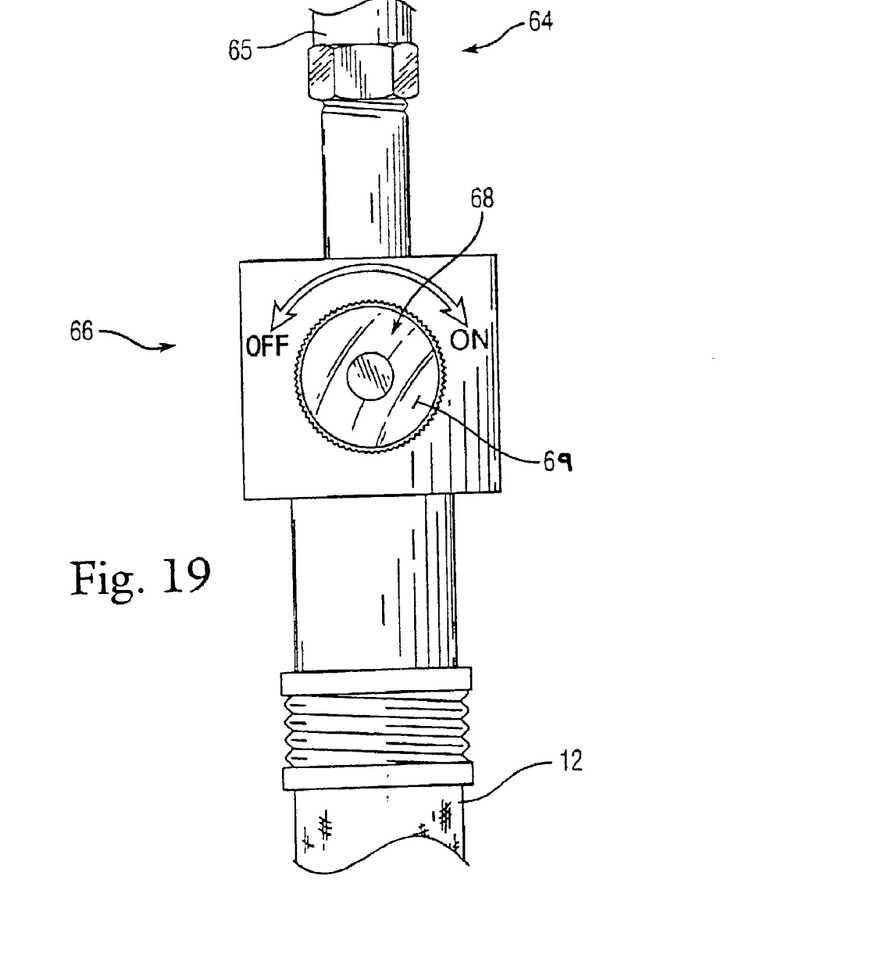
FIG. 19 is a top plan view of a control valve on a rearwardly-projecting portion of the barrel for controlling the water flow, the view being taken along the lines 19—19 of FIG. 2.

A barrel 64 is disposed in the upper portion 20 of the housing 13 (and preferably is suitably trapped therein). The barrel 64 has a portion 65 extending rearwardly of the housing 13 (see FIG. 19) for connection, via a suitable coupling 66, to the coiled hose 12 (shown in FIGS. 1 and 2). The coupling 66 (see FIG. 19) has a control means 68 for regulating the water flow from the coiled hose 12. One possible embodiment of the control means 68 comprised a knob 69 which can be moved between its "on" and "off" positions to control the quantity of water flowing out of the barrel 64. The coiled hose 12, in turn, may be connected to a standard garden hose 67 (FIG. 1B).

In this preferred embodiment, the rearwardly-extending (female) portion 65 of the barrel 64 is internally-threaded, and the coupling 66 comprises a standard adapter having a male fitting to engage the female part of the extending portion 65 of the barrel 64. The other end of the coupling 66 has a female fitting for receiving the male part of the standard coiled or lightweight hose 12. (See FIGS. 1A, 1B and 2). The coupling 66 may be available from a local hardware store but, preferably, is supplied along with the shampooing tool 10.

Figure 17:
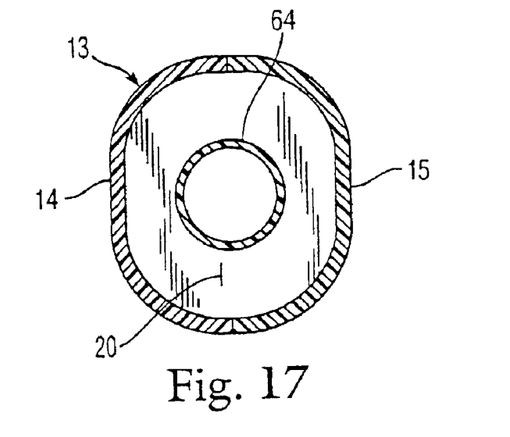
FIG. 17 is a cross-section of the barrel of the shampooing tool, taken along the lines 17—17 of FIG. 2.
Figure 18:
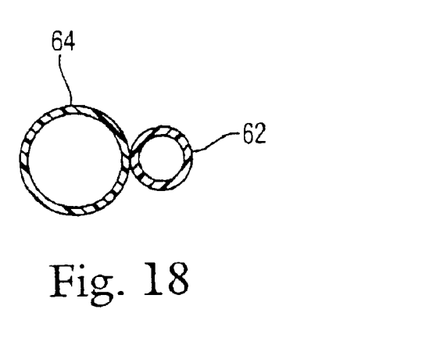
FIG. 18 is a further cross-section of the barrel, taken forwardly of the tool and along the lines 18—18 of FIG. 2, and showing the tube for flow of the pressurized liquid detergent, the tube running substantially parallel to the barrel and both terminating in a shampooing head.
Figure 20:
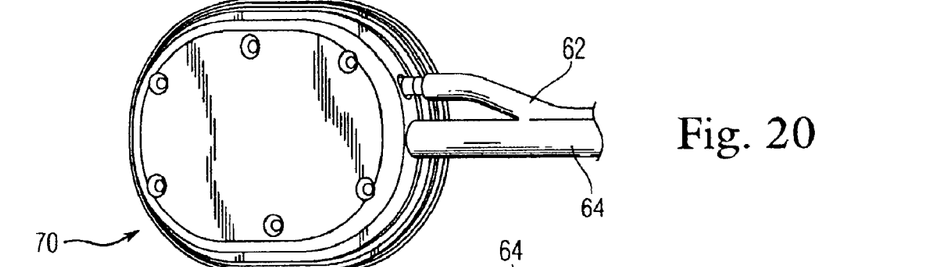
FIG. 20 is a top plan view of a preferred shampooing head on the tool (the head being tilted).
Figure 21:
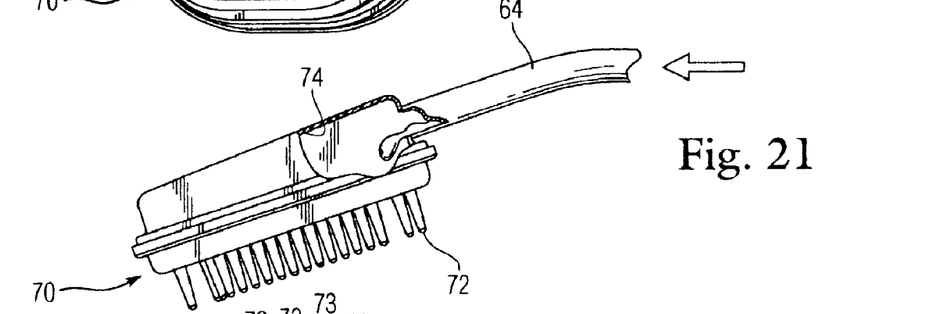
FIG. 21 is a side elevational view thereof (the shampooing head being substantially hollow and in communication with the water flow through the barrel).
Figure 22:
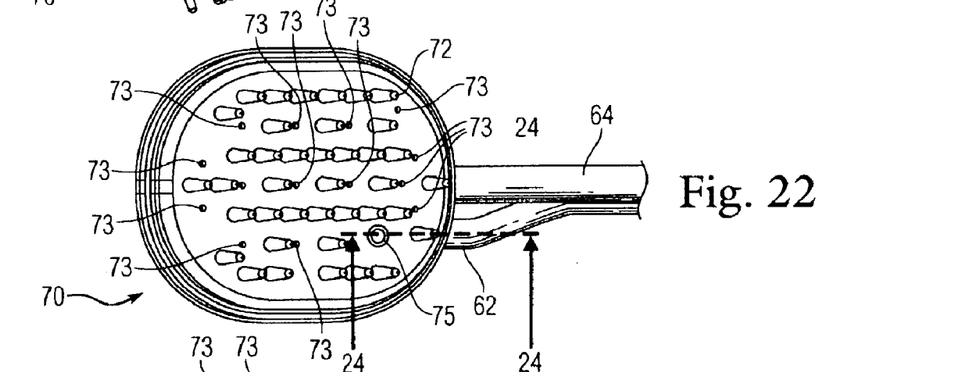
FIG. 22 is a bottom plan view thereof (again, the head being tilted, FIG. 20).

With reference to FIGS. 17 and 18, and to FIGS. 20–22, the barrel 64 (for the water flow) and the external tube 62 (for flow of the pressurized liquid detergent 39) run substantially parallel to each other (see FIG. 18) and diverge (FIG. 20) at a shampooing head 70 carried on the respective forward ends of the barrel 64 and tube 62. The tube 62 and barrel 64 constitute a wand 71 for the tool 10 (see FIGS. 1A and 1B).

Figures 23, 24:
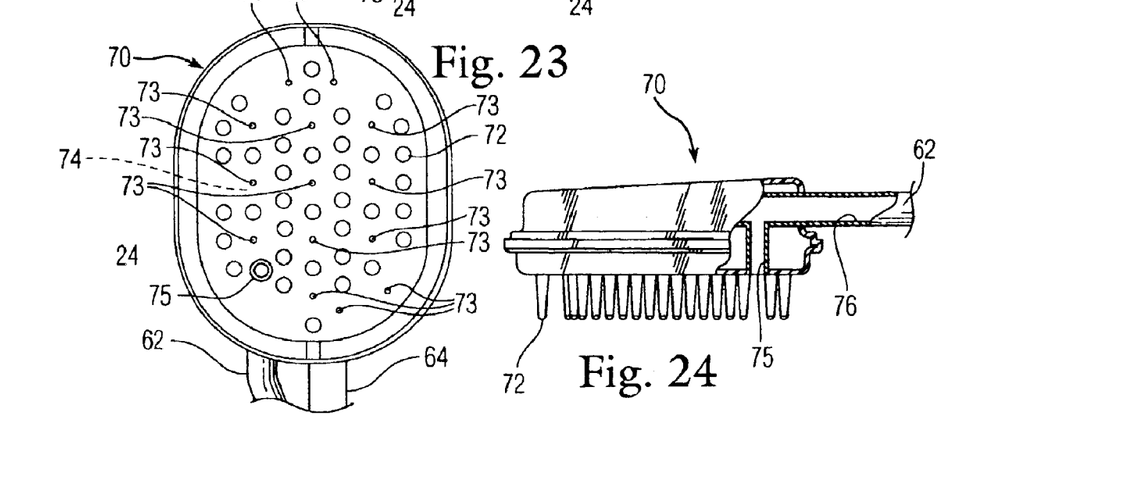
FIG. 23 is a full bottom plan view of the shampooing head.
FIG. 24 is a cross-section, taken along the lines 24—24 of FIG. 22, and showing a canal or passageway for flow of the pressurized liquid detergent, intermediately of the bristles.
Figure 25:
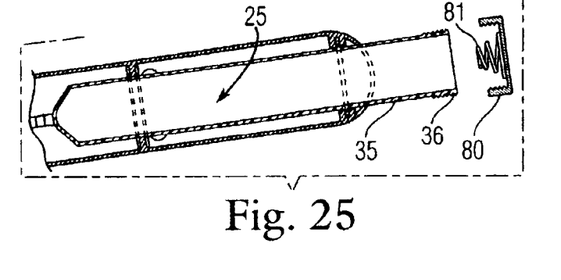
FIG. 25 is a partial elevational view of another embodiment of the present invention showing an end cap (with a suitable spring attached thereto) removed from the tool. In this embodiment, the piston has been eliminated.
Figure 26:
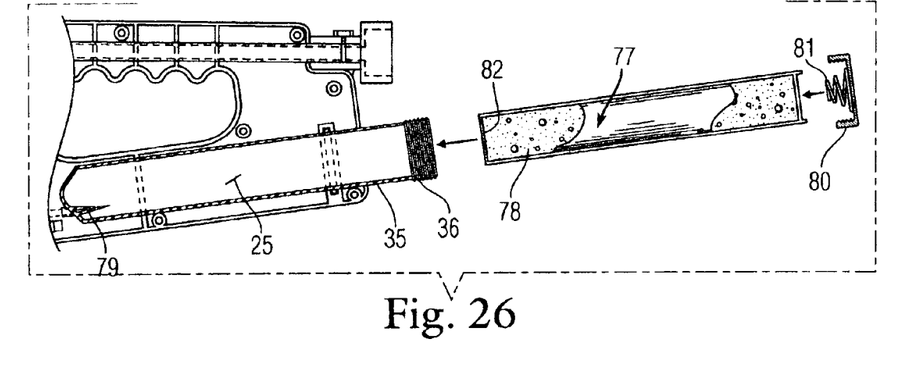
FIG. 26 corresponds substantially to FIG. 25, but shows the end cap and a pre-packaged disposable cartridge in exploded relationship to the tool, the cartridge having a pressurized liquid detergent contained therein.
Figure 27:
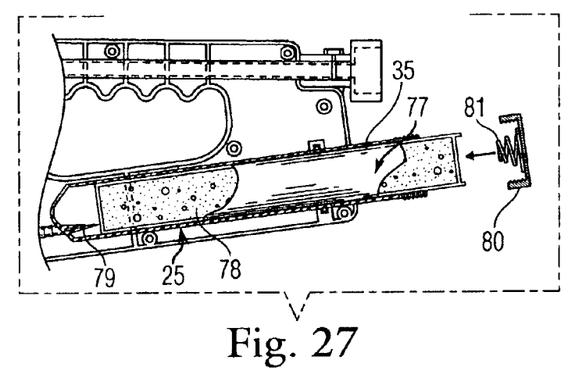
FIG. 27 corresponds substantially to FIG. 26, but shows the cartridge inserted into the cylinder, and further showing the forward portion of the cylinder engaging a needle within the housing.
Figure 28:
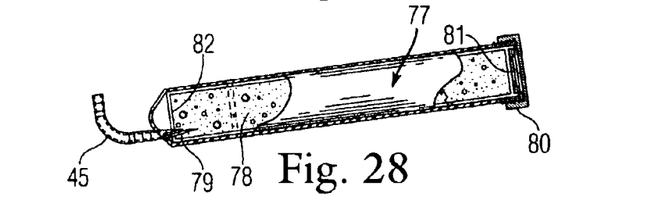
FIG. 28 corresponds substantially to FIG. 27, but shows the needle in the cylinder piercing the seal on the cartridge as the end cap (preferably knurled or grooved) is tightened on the rearwardly-extending portion of the cylinder.
Figure 29:
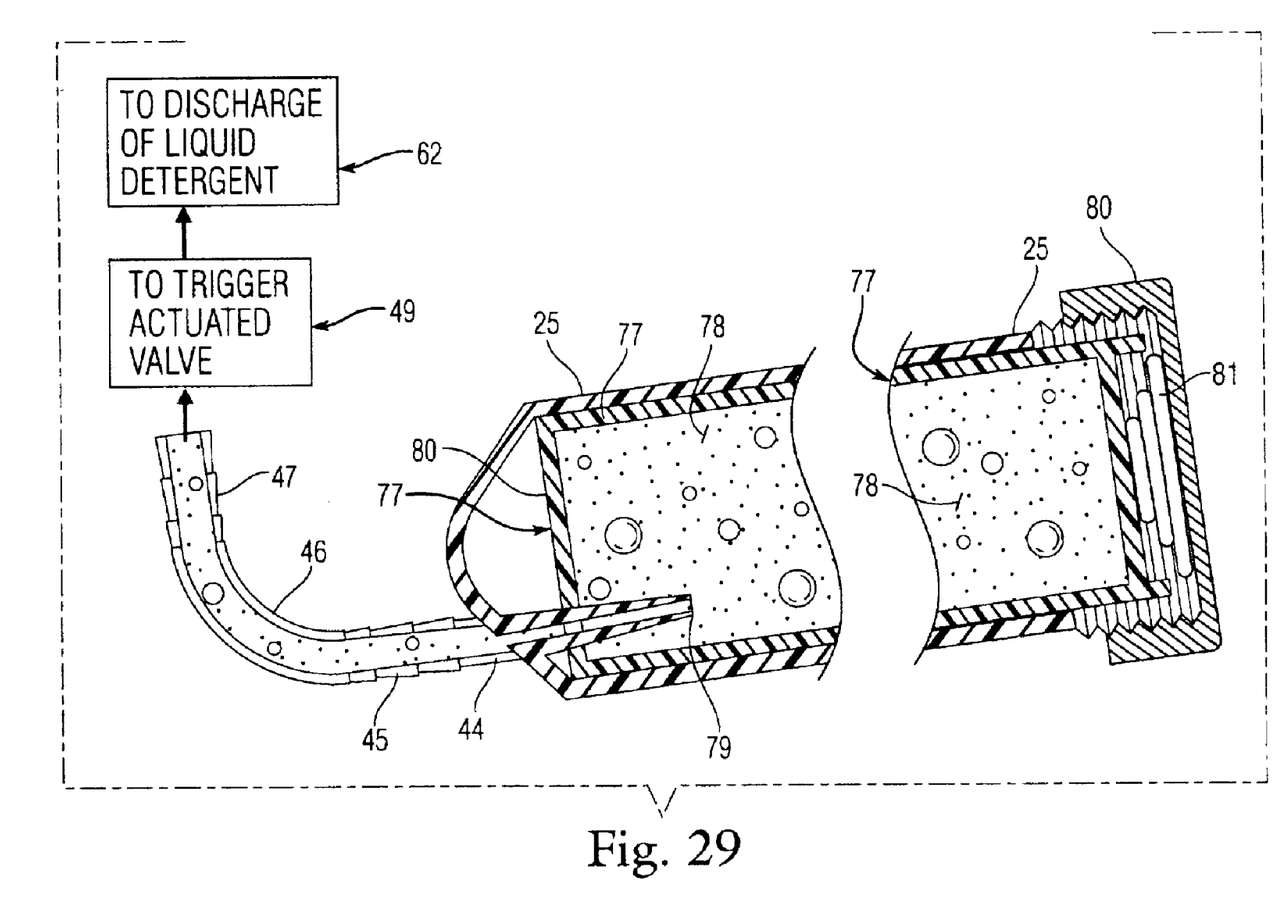
FIG. 29 is an enlarged portion of FIG. 28, showing the end cap fully tightened, the spring (which in this case, is carried by the end cap) being compressed, and showing the needle fully piercing or rupturing the seal on the cartridge. In this view, the needle is connected to a trigger-actuated valve for flow of the pressurized liquid detergent to the shampooing head. These latter mechanisms are shown schematically, but could be similar to those in FIG. 2.

The shampooing head 70 shown in the drawings is exemplary of various interchangeable implements or heads that may be mounted on the wand 71 (see FIGS. 20–24). With this in mind, and with reference to FIGS. 20–24, the shampooing head 70 has a plurality of suitable bristles 72 depending therefrom (FIG. 21). Interposed between the bristles 72 is a first set of orifices 73 (FIGS. 22 and 23). The shampooing head 70 is substantially hollow, as at 74, so that the first orifices 73 are in communication with the water flow through the barrel 64 (FIG. 21). A second orifice 75 as shown in FIGS. 22–24, (or a second set of orifices) is in communication with tube 62 through a canal 76 (FIG. 24) to facilitate flow of the pressurized liquid detergent 39 out of the shampooing head 70. The orifices 73 and 75 are independent of each other; and, preferably, the single orifice 75 for the liquid detergent (the soap) 39 assures that the soap will be used economically and sparingly and thus not unduly wasted. Indeed, the dispensing of the soap is independent of the water flow; it is completely under the operator's control and does not depend upon the water flow to aspirate the liquid soap out of its reservoir.

With reference to FIGS. 25–29, and in lieu of pouring the liquid detergent 39 into the cylinder 25 (per FIGS. 7–10), the subassembly 38 (comprising the piston 29, coil spring 32, lanyard 37 and end cap 34) is dispensed with; and a pre-packaged disposable cartridge 77 is employed. This disposable cartridge 77 (see FIG. 26) contains a reservoir 78 of liquid detergent under pressure and is slidably received within the cylinder 25 to abut against a needle 79 within the cylinder 25 (FIG. 27); and an end cap 80 is threaded or otherwise secured on to the rearwardly-projecting portion 35 of the cylinder 25. A coiled spring 81 is carried by the end cap 80 and pushes the cartridge 77 against the needle 79, such that the needle 79 pierces and/or ruptures a frangible seal 82 (see FIG. 29) on the forward portion of the cartridge 77 to allow the liquid detergent 78 under pressure in the cartridge 77 to flow through the needle 79 and to the valve 49 (for discharge, as at 62). The disposable cartridge 77, which may be sold in a "3 pack" or a "6 pack", may be more convenient for the consumer.

Figure 30:
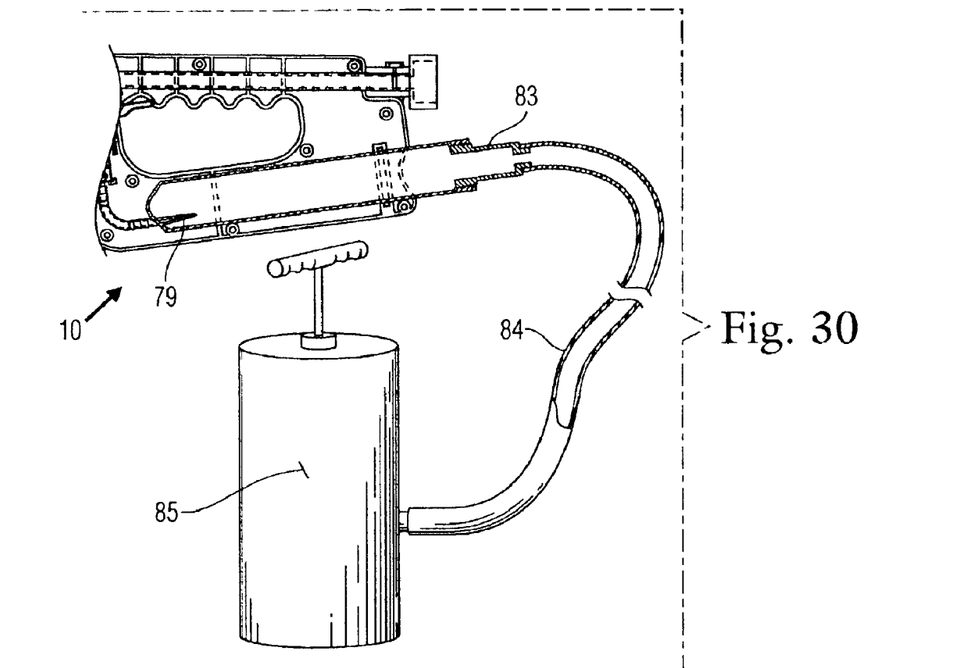
FIG. 30 is a pictorial view of the shampooing tool of FIG. 29, wherein the disposable cartridge is not used, wherein the end cap has been removed and replaced with a suitable coupling, and wherein the coupling is connected to a hose leading to a pressurized (external) tank of liquid detergent.

With reference to FIG. 30, no cartridge is employed; and a suitable coupling 83 communicates through a hose 84 with a pressurized tank 85 of liquid detergent externally of the tool 10. This will be more economical, especially for a commercial dog-grooming or horse-grooming facility.

Figure 31:
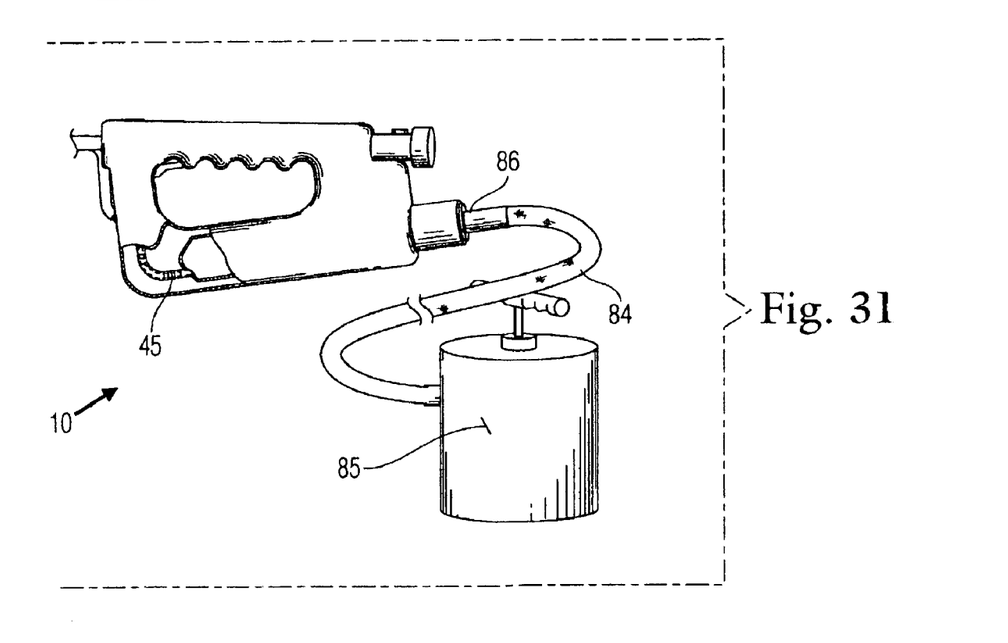
FIG. 31 is a further pictorial view, wherein the end cap of FIG. 2 is removed, and wherein an interchangeable coupling means is substituted for the end cap, the interchangeable coupling means coupling the reservoir in the housing to a pressurized tank of liquid detergent disposed externally of the tool.

With reference to FIG. 31, the end cap 34 (in the FIG. 2 embodiment) is dispensed with and is substituted by a suitable coupling 86 to the pressurized tank 85.

Accordingly, it will be appreciated that the shampooing tool 10 of the present invention meets all of its objectives and criteria, and has features and advantages heretofore not available in the prior art. The tool is lightweight, compact, well-balanced, sturdy, and ergonomically designed for easy and convenient use by the owners of dogs, horses or other animals as well as for use by professional groomers. The operator of the tool has excellent control, independently, of both the water and the liquid detergent (the soap) for metering out the soap for best results, efficiently and economically. Besides its widespread commercial appeal, the shampooing tool of the present invention may be manufactured in volume and at relatively low cost for promotion and merchandising through various channels of marketing and distribution.

Additionally, the liquid detergent may incorporate a suitable fragrance and/or suitable insecticide especially for fleas or ticks.

Obviously, many modifications may be made without departing from the basic spirit of the present invention. For example, in lieu of the trigger 56, the valve 49 may be unseated by a battery-operated solenoid actuated by a push button on the tool (not shown herein). Accordingly, it will be appreciated by those skilled in the art that within the scope of the appended claims, the invention may be practiced other than has been specifically described herein.

What is claimed is:

1. In a shampooing tool, the combination of a barrel connected to a pressurized water supply, a tube connected to an external pressurized source of liquid detergent, the tube running substantially parallel to and alongside of the barrel and forming a wand for the tool, the barrel having a forwardmost portion provided with a shampooing head, the shampooing head having a plurality of orifices in fluid communication with the barrel and the pressurized water supply, the shampooing head further having an orifice in fluid communication with the pressurized source of liquid detergent, said orifice for the liquid detergent being completely independent of the plurality of orifices for the water supply.

2. The combination of claim 1, wherein the shampooing head has downwardly-projecting bristles intermediately of the plurality of orifices in fluid communication with the barrel and the pressurized water supply and the orifice in fluid communication with the pressurized source of liquid detergent.

3. The combination of claim 1, further including a housing having an upper portion enclosing an intermediate portion of the barrel.

4. The combination of claim 3, wherein the barrel has a rearward portion extending rearwardly of the housing and being connected to the pressurized water supply.

5. The combination of claim 4, further including a pivoted control valve on the rearward portion of the barrel.

6. A shampooing tool, comprising a housing including an upper portion forming a hand grip for the tool, the upper portion of the housing containing a barrel having a rearward portion connected to a pressurized water supply, the hand grip being provided with a trigger, the housing further including a lower portion having a rearward portion, disposed below the rearward portion of the barrel, and being connected to a reservoir of liquid detergent under pressure, the housing further having a front portion connecting the respective upper and lower portions of the housing, a spring-loaded normally-closed valve within the front portion of the housing, the valve seating against a valve seat connected to the pressurized reservoir of liquid detergent, the valve being connected to the trigger for movement in unison; such that when the trigger is actuated, the valve is unseated and liquid detergent passes through the valve seat, around the valve, and through a discharge port in the front portion of the housing, a tube connected to the discharge port and projecting forwardly of the housing, the barrel extending forwardly of the housing, the barrel and tube being substantially parallel to each other, having respective forward ends, and forming a wand for the tool, and a shampooing implement connected to the forward ends of the barrel and tube, respectively., such that use of the pressurized liquid detergent may be economically metered, and such that the tool may be used for a soaking, soaping and rinsing cycle.

7. The shampooing tool of claim 6; wherein the housing has a pair of complementary mating halves joined together along a common longitudinal midplane; wherein the trigger, valve and cylinder are mounted in one of the mating halves of the housing; and wherein the other mating half of the housing comprises a cover secured to the one mating half.

8. The shampooing tool of claim 7, wherein the trigger includes an integrally-molded rib portion slidably mounted between respective pairs of lands formed in the one mating half of the housing.

9. The shampooing tool of claim 6, wherein the valve has an integrally-molded stem projecting upwardly thereof, the stem having a slot formed therein, and wherein the trigger has a forwardly-extending integrally-molded portion received in the slot.

10. The shampooing tool of claim 6, wherein the valve has a conical tip seated on the valve seat.

11. The shampooing tool of claim 6, wherein the tube and barrel run substantially parallel to each other and forwardly of the housing.

12. The shampooing tool of claim 6, wherein the housing has a rearward portion connecting the respective upper and lower portions of the housing, such that the hand grip is fully enclosed.

13. The shampooing tool of claim 12, wherein the upper portion of the housing is provided with curved finger indentations projecting into the fully-enclosed hand grip, the curved finger indentations being disposed rearwardly of the trigger.

14. The shampooing tool of claim 6, wherein the rearward portion of the barrel extends rearwardly of the housing, being connected to the pressurized water supply, and wherein the rearward portion of the barrel is provided with a control means for controlling the volume of water running through the barrel.

15. The shampooing tool of claim 6, wherein the shampooing tool is intended for dogs, horses and/or other animals.

16. In a shampooing tool, the combination of a housing having an upper portion forming a hand grip for the tool, a barrel within the upper portion of the housing, the barrel having respective forward and rearward end portions disposed externally of the housing, a shampooing implement mounted on the forward end portion of the barrel, the rearward end portion of the barrel being connected to a pressurized water supply, a trigger within the hand grip, the trigger being connected to a valve assembly within a front portion of the housing, the housing further having a lower portion connected to an external pressurized reservoir of liquid detergent in fluid communication with the valve assembly, and a tube connected to the external pressurized reservoir of liquid detergent and running substantially parallel to and alongside of the barrel providing a wand for the tool, and connected to the shampooing implement; such that when the trigger is actuated, the liquid detergent flows into the barrel and is discharged through the shampooing implement on the forward portion of the barrel.

17. The shampooing tool of claim 16 used for shampooing a dog, horse or other animal.

18. A method of shampooing a dog, horse or other animal, comprising the steps of providing a shampooing tool having a trigger within an enclosed hand grip on the tool, the tool further having a valve seated on a valve seat communicating with an external pressurized source of liquid detergent through a lower portion of the housing, the tool further having a barrel disposed in an upper portion of the housing, the barrel having a forward portion connected to a shampooing implement and further having a rearward portion connected to a pressurized water supply through a control valve, releasing the control valve to allow water to soak the dog, horse or other animal, actuating the trigger to unseat the valve from its valve seat, such that the liquid detergent under pressure mixes with the water flow or with the water already on the dog, horse or other animal, thereby economically metering use of the liquid detergent, manipulating the shampooing head to scrub down the dog, horse or other animal, and then deactivating the trigger and holding the control valve in an open position, rinsing off the dog, horse or other animal, thereby conveniently providing a "soak", "soap", "scrub" and "rinse" cycle, respectively.

19. In a shampooing tool, the combination of a hand-held housing having a barrel connected to a pressurized water supply, a tube connected to an external pressurized source of liquid detergent in the housing, the tube extending out of the housing and running substantially parallel to and alongside of the barrel, the tube and barrel forming a wand for the tool and terminating in respective forward ends, a shampooing head connected to the forward end of the barrel and tube, respectively, the shampooing head having a plurality of respective orifices for the water, the plurality of respective orifices communicating with the forward end of the barrel, and the shampooing tool further having an orifice communicating with the forward end of the tube, wherein the discharge of the liquid detergent is independent of the plurality of orifices for the water flow.

20. The combination of claim 19, further including a first control means for the water flow and a second control means for the flow of liquid detergent through the shampooing head.

21. The combination of claim 20, wherein the second control means comprises a trigger selectively unseating a normally-closed spring-loaded valve connecting the tube to the pressurized source of liquid detergent in the housing.

22. The combination of claim 21 used for shampooing a dog, horse or other animal.

23. A shampooing tool, comprising a housing provided with a hand grip, the housing including an upper rearward portion connected to an external water supply under pressure, a lower rearward portion connected to an external supply of a liquid detergent under pressure, an upper portion, and a front portion having a discharge port connected to the pressurized supply of liquid detergent, a valve between the discharge port and the pressurized supply of liquid detergent, the valve being controlled by a trigger depending from a hand grip formed in the upper portion of the housing, a barrel extending from the upper portion of the housing and connected to the external pressurized water supply, a tube connected to the discharge port for the pressurized liquid detergent, the barrel and tube extending forwardly of the housing and having respective ends, and a shampooing implement connected to the ends of the barrel and tube, respectively, the shampooing implement having a plurality of orifices for the water flow and at least one orifice interspersed therebetween for the flow of liquid detergent.

24. The shampooing tool of claim 23, wherein the barrel and tube are substantially parallel to, and alongside of, each other.

25. The shampooing tool of claim 23, wherein the shampooing implement is interchangeable.

* * * * *